J. AITCHISON & J. F. DOOLITTLE.
Boiler-Flue Cleaner.

No. 217,570.           Patented July 15, 1879.

UNITED STATES PATENT OFFICE.

JAMES AITCHISON AND JOHN F. DOOLITTLE, OF CLEVELAND, OHIO.

IMPROVEMENT IN BOILER-FLUE CLEANERS.

Specification forming part of Letters Patent No. 217,570, dated July 15, 1879; application filed May 26, 1879.

*To all whom it may concern:*

Be it known that we, JAMES AITCHISON and JOHN F. DOOLITTLE, of Cleveland, in the county of Cuyahoga and in the State of Ohio, have invented certain new and useful Improvements in Boiler-Flue Cleaners; and do hereby declare that the following is a full, clear, and exact description thereof, reference being had to the accompanying drawings, and to the letters of reference marked thereon, making a part of this specification.

The nature of our invention consists in the construction and arrangement of a device for cleaning boiler-flues by steam, as will be hereinafter more fully set forth.

In order to enable others skilled in the art to which our invention appertains to make and use the same, we will now proceed to describe its construction and operation, referring to the annexed drawings, in which—

Figure 1:
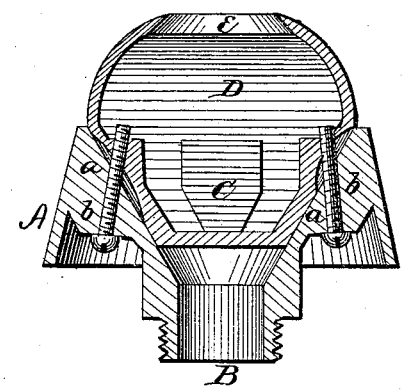
Figure 2:
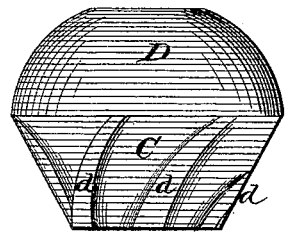

Figure 1 is a central longitudinal section of our machine. Fig. 2 is a side view, and Fig. 3 an end view of the inner cone thereof.

A represents a truncated cone of any suitable dimensions, formed on the inside with a tapered seat at $a$, and having hollow projection B, with exterior screw-threads for the attachment of a pipe to convey steam into the same.

Figure 3:
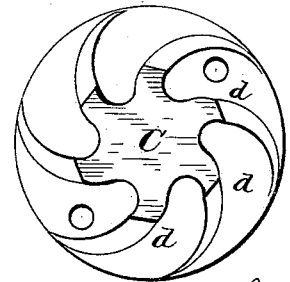

On the seat $a$ is placed an inside cone, C, fastened to the outside cone by screws $b\,b$, and so arranged as to admit of steam passing between them. The end of the inner cone projects beyond the outer cone in the shape of a semi-sphere, D, which is made hollow, and has an opening, E. In the exterior surface of the inner cone C is made a series of spiral grooves, $d\,d$, as shown in Figs. 2 and 3. This device is inserted in the end of the flue to be cleaned and the steam turned on. The steam then passes between the two cones and is guided to the surface of the flue all around.

The spiral grooves $d$ give a spiral motion to the steam, whereby the scale and other obstacles are removed with more force than by a direct jet of steam.

The semi-sphere D in front acts as a guide to enter the flue, and also as a protector to the machine where the steam leaves the flue-cleaner. The spiral motion of the steam may be imparted by other means than the cone.

Having thus fully described our invention, what we claim as new, and desire to secure by Letters Patent, is—

1. The semi-spherical cone D, formed on the cone C, and projecting beyond the steam-outlet, in combination with the outer cone, A, for the purposes herein set forth.

2. The combination of the outside cone, A, with seat $a$ and steam-inlet B, the inside cone, C, having spiral grooves $d$ and semi-spherical cone D, all constructed substantially as and for the purposes herein set forth.

In testimony that we claim the foregoing we have hereunto set our hands this 21st day of May, 1879.

JAMES AITCHISON.
    JOHN F. DOOLITTLE.

Witnesses:
 CLINTON A. VINCENT,
 Mrs. J. F. DOOLITTLE.